United States Patent
Zhang et al.

(10) Patent No.: US 11,781,661 B1
(45) Date of Patent: Oct. 10, 2023

(54) VALVE CORE FOR FAUCET

(71) Applicant: Xiamen Forbetter Sanitary Ware Co., Ltd., Fujian (CN)

(72) Inventors: Xingui Zhang, Xiamen (CN); Yihui Chen, Xiamen (CN); Mouyong Lin, Xiamen (CN)

(*) Notice: Subject to any disclaimer, the term of this patent is extended or adjusted under 35 U.S.C. 154(b) by 0 days.

(21) Appl. No.: 17/851,018

(22) Filed: Jun. 27, 2022

(51) Int. Cl.
*F16K 11/07* (2006.01)
*F16K 11/078* (2006.01)
*F16K 11/056* (2006.01)

(52) U.S. Cl.
CPC ........ *F16K 11/0782* (2013.01); *F16K 11/056* (2013.01); *Y10T 137/86823* (2015.04)

(58) Field of Classification Search
CPC ............. F16K 11/0782; F16K 11/0785; F16K 11/0787; F16K 31/602; F16K 31/605; F16K 27/045; F16K 11/056; F16K 11/0565; F16K 11/074; F16K 11/0743; F16K 11/0746; F16K 11/072; Y02A 20/411; G05D 23/13–1373; Y10T 137/86823
USPC .................. 137/625.4, 625.41; 251/285, 286
See application file for complete search history.

(56) References Cited

U.S. PATENT DOCUMENTS

| | | | | |
|---|---|---|---|---|
| 3,035,612 A * | 5/1962 | Lyon | ................... | F16K 11/0787 D23/238 |
| 3,533,436 A * | 10/1970 | Parkison | ............... | F16K 27/045 137/454.6 |
| 3,667,503 A * | 6/1972 | Farrell | ................ | F16K 11/0655 137/625.4 |
| 3,854,493 A * | 12/1974 | Farrell | ................ | F16K 11/0787 137/454.6 |
| 4,088,153 A * | 5/1978 | Paasikivi | ............ | F16K 11/0787 137/625.4 |
| 4,325,403 A * | 4/1982 | Uhlmann | ............ | F16K 11/0787 137/315.18 |
| 4,540,023 A * | 9/1985 | Pawelzik | ............ | F16K 11/0787 137/625.17 |
| 4,576,202 A * | 3/1986 | Knapp | ................ | F16K 11/0782 137/625.4 |
| 4,672,999 A * | 6/1987 | Knapp | ................ | F16K 11/0782 137/625.4 |
| 4,687,025 A * | 8/1987 | Kahle | ................. | F16K 11/0787 137/636.2 |
| 4,708,172 A * | 11/1987 | Riis | ....................... | F16K 31/605 251/285 |
| 4,738,281 A * | 4/1988 | Limet | ................ | F16K 11/0782 137/625.4 |
| 4,804,011 A * | 2/1989 | Knapp | ................ | F16K 11/0782 137/636.2 |

(Continued)

*Primary Examiner* — Craig J Price

(57) ABSTRACT

A valve core for a faucet includes a casing, an immovable plate, a movable plate unit, a bracket, and a lever. The movable plate unit includes two pairs of coaxial movable plates and dials. The movable plates are disposed on top of the immovable plate. A restricting mechanism is disposed between one dial and the casing, and another restricting mechanism is disposed between the other dial and the bracket. When the lever is opened, the restricting mechanism is unlocked, and the lever is rotated to adjust the water temperature of a manual spray mode of the faucet. When the lever is closed, the restricting mechanism is locked, and the lever is rotated to adjust the water temperature of an automatic spray mode of the faucet. The water temperature adjustments of the manual spray mode and the automatic spray mode are independent of each other.

10 Claims, 10 Drawing Sheets

(56) References Cited

U.S. PATENT DOCUMENTS

| | | | | |
|---|---|---|---|---|
| 4,854,347 | A * | 8/1989 | Knapp | F16K 47/026 251/127 |
| 5,095,934 | A * | 3/1992 | Iqbal | F16K 27/045 137/636.2 |
| 5,402,827 | A * | 4/1995 | Gonzalez | F16K 11/0787 137/271 |
| 6,209,581 | B1 * | 4/2001 | Gyozo | F16K 11/0782 251/235 |
| 6,892,761 | B2 * | 5/2005 | Chen | F16K 11/0743 137/625.4 |
| 6,920,899 | B2 * | 7/2005 | Haenlein | F16K 11/0746 137/636.3 |
| 6,966,335 | B2 * | 11/2005 | Chen | F16K 31/605 137/636.3 |
| 7,044,162 | B2 * | 5/2006 | Bolgar | F16K 11/078 137/625.4 |
| 7,213,614 | B2 * | 5/2007 | Chen | F16K 11/0782 251/313 |
| 7,373,950 | B2 * | 5/2008 | Huang | F16K 11/0785 137/636.3 |
| 7,487,797 | B2 * | 2/2009 | Di Nunzio | F16K 11/0787 137/625.18 |
| 7,845,574 | B2 * | 12/2010 | Mace | F16K 11/0787 236/12.21 |
| 8,474,481 | B2 * | 7/2013 | Huang | F16K 27/045 137/625.42 |
| 8,875,737 | B2 * | 11/2014 | Cattaneo | F16K 11/0787 137/625.4 |
| 9,309,976 | B2 * | 4/2016 | Marty | E03C 1/04 |
| 11,215,289 | B1 * | 1/2022 | Qiu | F16K 11/0787 |
| 11,300,217 | B2 * | 4/2022 | Ritter | F16K 27/044 |
| 2005/0000576 | A1 * | 1/2005 | Chen | F16K 11/0782 137/625.17 |
| 2012/0248351 | A1 * | 10/2012 | Huang | F16K 27/045 251/129.01 |
| 2018/0135765 | A1 * | 5/2018 | Kim | F16K 11/0787 |
| 2018/0223508 | A1 * | 8/2018 | Fassolette | F16K 31/002 |
| 2022/0163134 | A1 * | 5/2022 | Kobayashi | F16K 35/04 |

* cited by examiner

VALVE CORE FOR FAUCET

BACKGROUND OF THE INVENTION

1. Field of the Invention

The present invention relates to a valve core, and more particularly to a valve core for a faucet.

2. Description of the Prior Art

In general, a conventional sensor faucet includes a valve core and an infrared sensor. It is necessary to provide a mechanical switch to control the opening and closing of the water supply of the main waterway. As a result, parts such as control boxes and water pipes need to be installed under the basin, and the structure is relatively complex. If the circuit malfunctions, the faucet cannot be operated manually to supply water.

A conventional dual-purpose faucet includes a manual spray mode that is controlled by a mechanical switch and an automatic spray mode that is controlled by an infrared sensor. Through a mechanical switch (namely, the handle), the mixing ratio of hot water and cold water (hereinafter referred to as water temperature) can be adjusted for the manual spray mode and the automatic spray mode. When the handle is swung to be in a closed state, the waterway of the manual spray mode is closed. At this time, the handle can be rotated to adjust the water temperature of the automatic spray mode. When the handle is swung to be in an open state, the waterway of the manual spray mode is opened. At this time, the handle can be rotated to adjust the water temperature of the manual spray mode.

However, this structure has some shortcomings. The rotation of the handle actually controls the mixing ratio of hot water and cold water from the water inlet of the valve core, that is, the water temperature of the manual spray mode and the water temperature of the automatic spray mode are adjusted together and are not independent of each other. For example, after the user adjusts the water temperature of the automatic spray mode, if the user uses the manual spray mode and adjusts the water temperature, he/she needs to adjust the water temperature again when using the automatic spray mode next time. The user experience is poor. Besides, after adjusting the water temperature, it is necessary to keep the handle at the present rotation angle so as not to affect the water temperature of the automatic spray mode. The handle cannot be returned to the center position, which is not in line with the usage habits of some users.

SUMMARY OF THE INVENTION

The primary object of the present invention is to provide a valve core for a faucet, which enables the water temperature adjustments of a manual spray mode and an automatic spray mode of the faucet are independent of each other, so that the temperature adjustment operations of the manual spray mode and the automatic spray mode do not interfere with each other.

In order to achieve the above object, the present invention adopts the following technical solutions.

A valve core for a faucet comprises a casing, an immovable plate, a movable plate unit, a bracket, and a lever. The casing has an accommodating chamber. The accommodating chamber has a first inlet, a second inlet, a first outlet, and a second outlet. The immovable plate, the movable plate unit and the bracket are sequentially fitted in the accommodating chamber in a direction from one end to another end of the accommodating chamber. The movable plate unit includes a first movable plate, a second movable plate, a first dial, and a second dial. The first movable plate and the first dial are coaxially connected. The second movable plate and the second dial are coaxially connected and movably fitted between the first movable plate and the first dial. A first restricting mechanism is disposed between the first dial and the casing. A second restricting mechanism is disposed between the second dial and the bracket. A middle portion of the lever is coaxially pivoted to the bracket so that the lever can swing relative to the bracket. One end of the lever is connected to the movable plate unit. When the lever swings to be in an open state, the first restricting mechanism and the second restricting mechanism are in an unlocked state, the first inlet and the second inlet are in communication with the first outlet and are not in communication with the second outlet, and the lever is rotated to adjust a relative position of the first movable plate and the immovable plate, so as to adjust a water mixing ratio of the first inlet, the second inlet and the first outlet. When the lever swings to be in a closed state, the first restricting mechanism and the second restricting mechanism are in a locked state, the first inlet and the second inlet are in communication with the second outlet and are not in communication with the first outlet, and the lever is rotated to adjust a relative angle between the second movable plate and the first movable plate, so as to adjust a water mixing ratio of the first inlet, the second inlet and the second outlet.

Preferably, the casing includes a main body and a cover. The main body has the accommodating chamber. The cover is connected to another end of the main body. The cover has a mounting hole for insertion of the bracket.

Preferably, the first restricting mechanism includes a protruding post disposed in the accommodating chamber and a guide groove disposed on a surface of the first dial. The guide groove is arranged along a radial direction of the first dial. The protruding post is movable between two ends of the guide groove when the lever swings. When the lever swings to be in the open state, the protruding post is located at the outer end of the guide groove, the lever is rotated for the movable plate unit to swing along a radial direction of the casing with the protruding post as a fulcrum, so as to adjust the relative position of the first movable plate and the immovable plate.

Preferably, a first protruding block is disposed in the accommodating chamber. The protruding post is disposed on the first protruding block. The bracket has a first notch. The first protruding block is movably fitted in the first notch along with rotation of the bracket. The protruding post passes through the first notch and is fitted in the guide groove.

Preferably, the first dial has a receiving chamber therein. The second movable plate and the second dial are movably fitted in the receiving chamber. The first dial further has an opening communicating with the receiving chamber. The second dial has a boss matching with the opening. The boss passes through the opening. The second restricting mechanism includes a second protruding block disposed on the bracket and a second notch formed on the boss. An arc length of the second notch is greater than a width of the second protruding block. When the lever swings to be in the open state, the second protruding block is separated from a circumferential path of the second notch. When the lever swings to be in the closed state, the second protruding block is located in the second notch. The lever drives the bracket to rotate synchronously, so that the second protruding block abuts against one end of the second notch to drive the second dial and the second movable plate to rotate relative to the first movable plate.

Preferably, the end of the lever is a ball joint. The second dial has a receiving groove. The ball joint is movably fitted in the receiving groove. The second notch is disposed on a side wall of one end of the receiving groove.

Preferably, an edge of the immovable plate has a first restricting notch. A first restricting block is disposed on a side wall of the accommodating chamber. The first restricting block is engaged in the first restricting notch. Edges of mating surfaces of the first dial and the first movable plate have a second restricting block and a second restricting notch. The second restricting block is embedded in the second restricting notch. Edges of the mating surfaces of the second dial and the second movable plate have a third restricting block and a third restricting notch. The third restricting block is embedded in the third restricting notch.

Preferably, the immovable plate further has two first perforations, a second perforation and a third perforation. The two first perforations are in communication with the first inlet and the second inlet, respectively. The second perforation is in communication with the first outlet. The third perforation is in communication with the second outlet. The first movable plate further has two fourth perforations, a first groove and a fifth perforation. The two fourth perforations are aligned with the two first perforations, respectively. When the first movable plate is moved relative to the immovable plate, the first groove is in communication with the first perforations and the second perforation, or the fifth perforation is in communication with the third perforation. The second movable plate further has a second groove and two stop blocks in the second groove. The fourth perforations and the fifth perforation are in communication with the second groove. The stop blocks are configured to block the corresponding fourth perforations for changing water flow when the second movable plate is rotated relative to the first movable plate.

Preferably, the valve core further comprises a sealing member disposed between an end wall of the accommodating chamber and the immovable plate. The sealing member has a first through hole, a second through hole and a third through hole corresponding to the first perforations, the second perforation and the third perforation, respectively.

Preferably, the first outlet is disposed at a middle position of the end of the casing. The first inlet, the second inlet and the second outlet are disposed beside the first outlet. The second outlet includes at least one second outlet.

Preferably, an annular step is formed on a peripheral surface of the end of the casing, and a sealing ring is sleeved on the annular step.

Through the above solution, in the present invention, the immovable plate, the first movable plate and the second movable plate are disposed in the casing as a waterway switching mechanism. The first restricting mechanism is disposed between the first dial and the casing, and the second restricting mechanism is disposed between the second dial and the bracket. Through different actions of the lever, the restricting mechanisms can be locked or unlocked. Thereby, different adjustments of the movable plate unit relative to the immovable plate can be realized under the different actions of the lever. The opening and closing and the water mixing ratio of the first inlet, the second inlet and the first outlet/the second outlet are independent of each other, so that temperature adjustment operations of the manual spray mode and the automatic spray mode of the faucet do not interfere with each other.

DETAILED DESCRIPTION OF THE PREFERRED EMBODIMENTS

Figure 1:
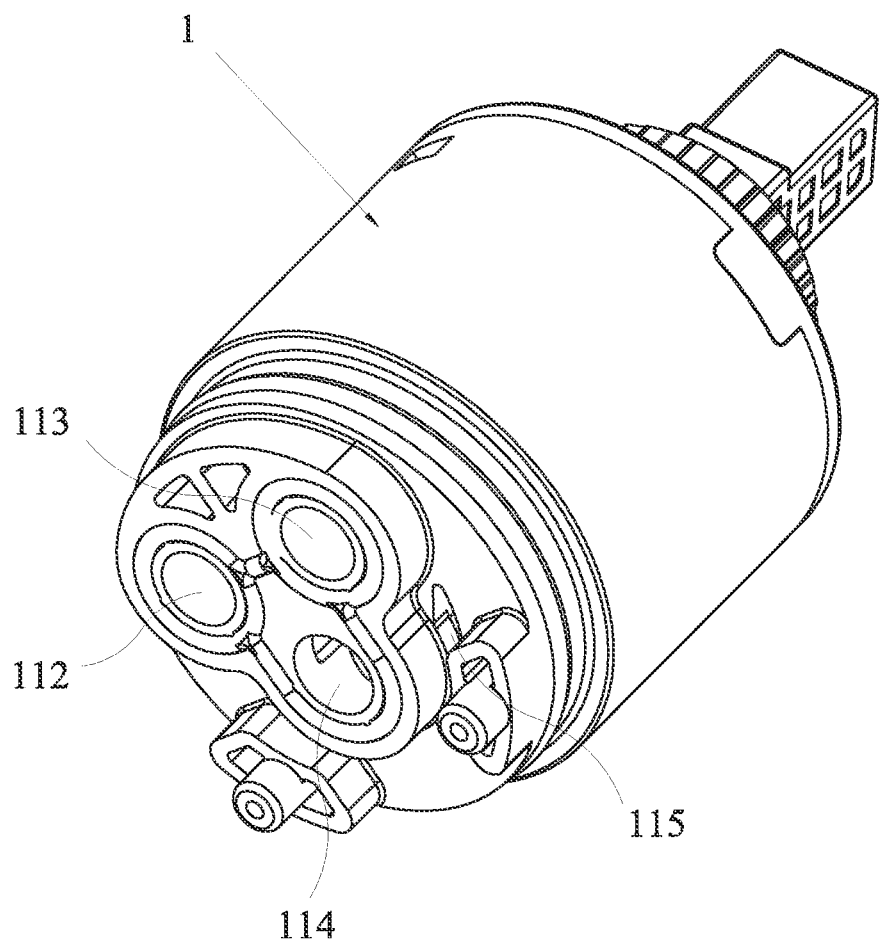
FIG. 1 is a perspective view of the valve core according to an embodiment of the present invention.

The present invention discloses a valve core for a faucet, comprising a casing 1, an immovable plate 2, a movable plate unit, a bracket 3, and a lever 4.

The casing 1 has an accommodating chamber 111. One end of the accommodating chamber 111 has a first inlet 112, a second inlet 113, a first outlet 114, and a second outlet 115.

The immovable plate 2, the movable plate unit and the bracket 3 are sequentially fitted in the accommodating chamber 111 in a direction from one end to the other end of the accommodating chamber 111.

The movable plate unit includes a first movable plate 5, a second movable plate 6, a first dial 7, and a second dial 8. The first movable plate 5 and the first dial 7 are coaxially connected. The second movable plate 6 and the second dial 8 are coaxially connected and movably fitted between the first movable plate 5 and the first dial 7. A first restricting mechanism is disposed between the first dial 7 and the casing 1. A second restricting mechanism is disposed between the second dial 8 and the bracket 3.

A middle portion of the lever 4 is coaxially pivoted to the bracket 3, so that the lever 4 can swing relative to the bracket 3. One end of the lever 4 is connected to the movable plate unit.

When the lever 4 swings to be in an open state, the first restricting mechanism and the second restricting mechanism are in an unlocked state, the first inlet 112 and the second inlet 113 are in communication with the first outlet 114 and are not in communication with the second outlet 115, and the lever 4 is rotated to adjust the relative position of the first movable plate 5 and the immovable plate 2, so as to adjust a water mixing ratio of the first inlet 112, the second inlet 113 and the first outlet 114.

When the lever 4 swings to be in a closed state, the first restricting mechanism and the second restricting mechanism are in a locked state, the first inlet 112 and the second inlet 113 are in communication with the second outlet 115 and are not in communication with the first outlet 114, and the lever 4 is rotated to adjust the relative angle between the second movable plate 6 and the first movable plate 5, so as to adjust the water mixing ratio of the first inlet 112, the second inlet 113 and the second outlet 115.

Figure 2:
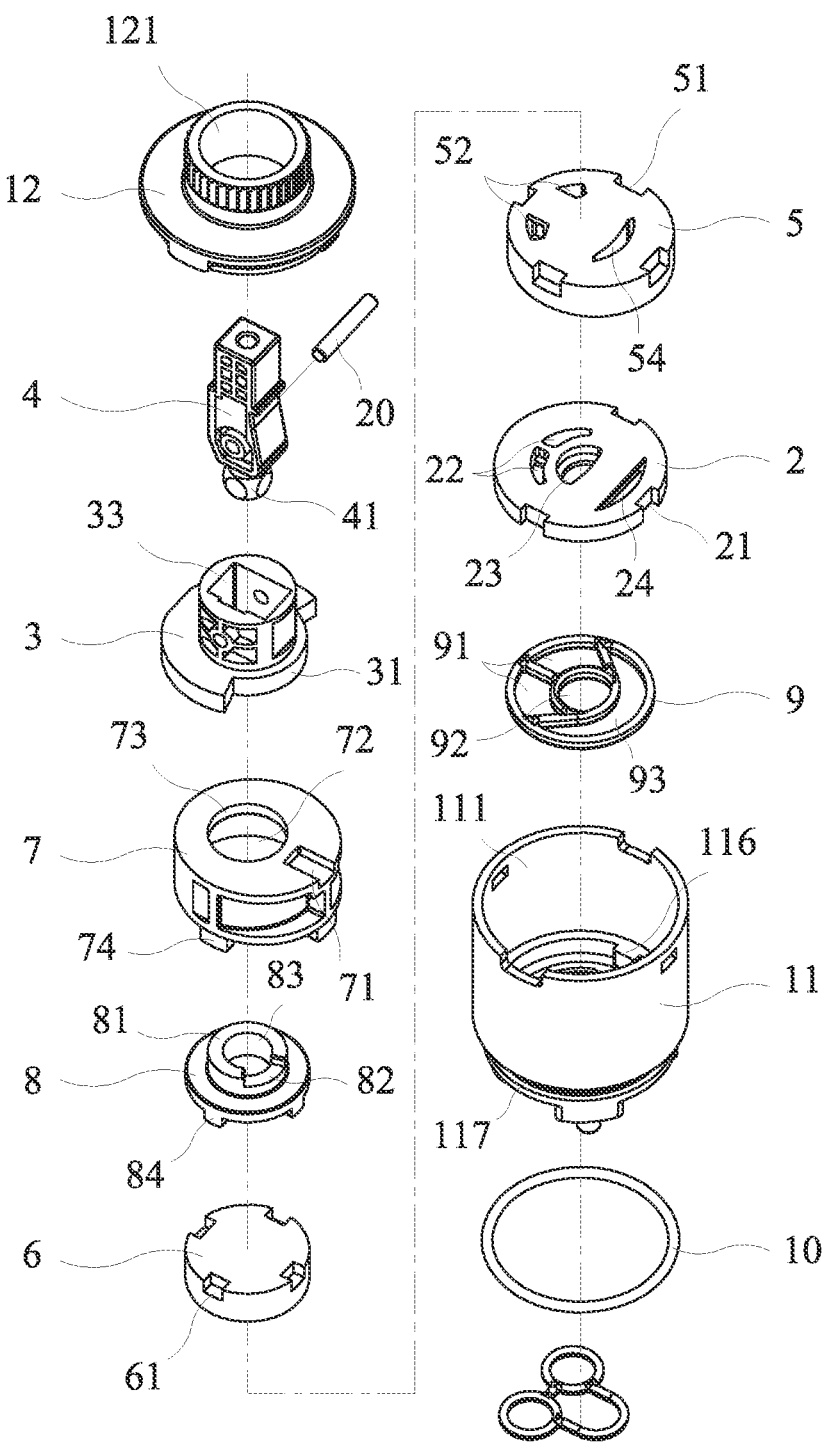
FIG. 2 is a first exploded view of the valve core according to the embodiment of the present invention.
Figure 3:
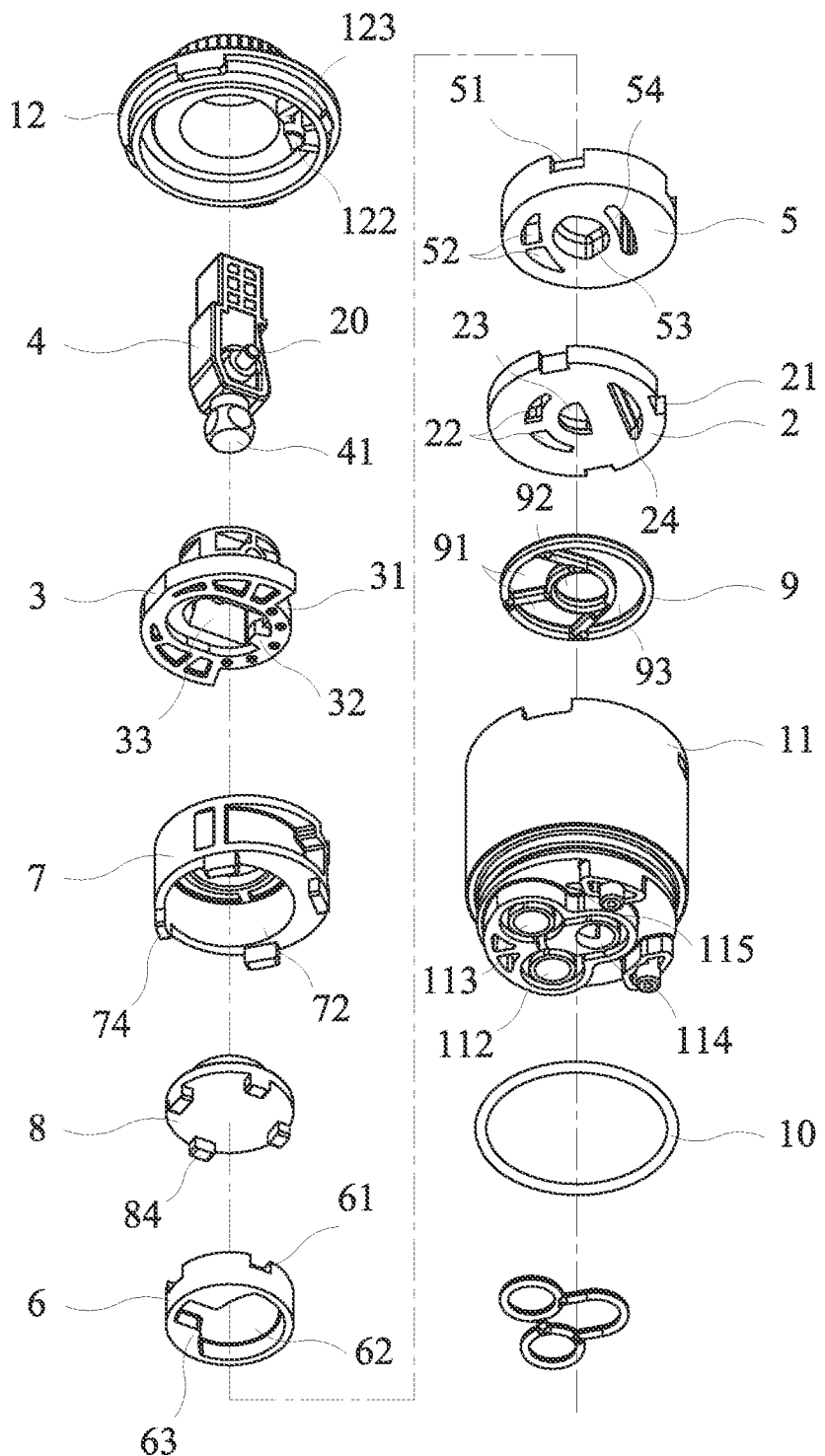
FIG. 3 is a second exploded view of the valve core according to the embodiment of the present invention.

FIGS. 1 to 3 show the specific embodiment of the present invention.

The casing 1 includes a main body 11 and a cover 12. The main body 11 has the accommodating chamber 111. One end of the main body 11 has the first inlet 112, the second inlet 113, the first outlet 114, and the second outlet 115. The cover 12 is connected to the other end of the main body 11. The cover 12 has a mounting hole 121 for insertion of the bracket 3.

The immovable plate 2, the first movable plate 5 and the second movable plate 6 are all ceramic plates, which have the advantages of high wear resistance, high sealing performance, and long service life.

The first restricting mechanism includes a protruding post 122 disposed in the accommodating chamber 111 (namely, the inner side of the cover 12) and a guide groove 71 disposed on the surface of the first dial 7. The guide groove 71 is arranged along the radial direction of the first dial 7. The protruding post 122 is movable between two ends of the guide groove 71 when the lever 4 swings. When the lever 4 swings to be in the open state, the protruding post 122 is located at the outer end of the guide groove 71. The lever 4 is rotated for the movable plate unit to swing along the radial direction of the casing 1 with the protruding post 122 as the fulcrum to adjust the relative position of the first movable plate 5 and the immovable plate 2, so as to adjust the water mixing ratio of the first inlet 112, the second inlet 113 and the first outlet 114. When the lever 4 swings to be in the closed state, the protruding post 122 is located at the inner end of the guide groove 71. When the lever 4 is rotated, the first dial 7 and the first movable plate 5 are not rotated. That is, when the lever 4 is in the closed state, the first movable plate 5 cannot be adjusted, but only the second movable plate 6 can be adjusted.

Furthermore, a first protruding block 123 is disposed in the accommodating chamber 111. The protruding post 122 is disposed on the first protruding block 123. The bracket 3 has a first notch 31. The first protruding block 123 is movably fitted in the first notch 31 along with rotation of the bracket 3. The protruding post 122 passes through the first notch 31 and is fitted in the guide groove 71. Because the position of the first protruding block 123 is immovable, the rotation range of the bracket 3 is restricted under the cooperation of the first protruding block 123 and the first notch 31, thereby restricting the angular range the lever 4 (the handle of the faucet) rotated by the user.

The first dial 7 has a receiving chamber 72 therein. The second movable plate 6 and the second dial 8 are movably fitted in the receiving chamber 72. The first dial 7 further has an opening 73 communicating with the receiving chamber 72. The second dial 8 has a boss 81 matching with the opening 73. The boss 81 passes through the opening 73. The second restricting mechanism includes a second protruding block 32 disposed on the bracket 3 and a second notch 82 formed on the boss 81. The arc length of the second notch 82 is greater than the width of the second protruding block 32. When the lever 4 swings to be in the open state, the second protruding block 32 is separated from the circumferential path of the second notch 82. When the lever 4 swings to be in the closed state, the second protruding block 32 is located in the second notch 82. The lever 4 drives the bracket 3 to rotate synchronously, so that the second protruding block 32 abuts against the end of the second notch 82 to drive the second dial 8 and the second movable plate 6 to rotate relative to the first movable plate 5, so as to adjust the water mixing ratio of the first inlet 112, the second inlet 113 and the second outlet 115. The second notch 82 with an arc length greater than the width of the second protruding block 32 is disposed on the boss 81, so that when the lever 4 is returned to the center position, the second notch 82 provides a space for movement of the second protruding block 32. The movement of the second protruding block 32 no longer pushes the second dial 8 to be returned. That is, the user can return the handle of the faucet after adjusting the water temperature of the automatic spray mode, without changing the water temperature of the automatic spray mode.

Further, one end of the lever 4 is a ball joint 41. The second dial 8 has a receiving groove 83. The ball joint 41 is movably fitted in the receiving groove 83. The second notch 82 is disposed on the side wall of one end of the receiving groove 83. As the lever 4 swings, the ball joint 41 rotates in the receiving groove 83 and pushes the second dial 8. Because the second dial 8 and the second movable plate 6 are located between the first dial 7 and the first movable plate 5, when the lever 4 swings, it can drive the entire movable plate unit to move along the radial plane of the casing 1, thereby changing the relative position of the first movable plate 5 and the immovable plate 2.

The edge of the immovable plate 2 has a first restricting notch 21. A first restricting block 116 is disposed on the side wall of the accommodating chamber 111. The first restricting block 116 is engaged in the first restricting notch 21 to secure the immovable plate 2 in the accommodating chamber 111. The edges of the mating surfaces of the first dial 7 and the first movable plate 5 have a second restricting block 74 and a second restricting notch 51. The second restricting block 74 is embedded in the second restricting notch 51 to realize the coaxial connection between the first dial 7 and the first movable plate 5. The edges of the mating surfaces of the second dial 8 and the second movable plate 6 have a third restricting block 84 and a third restricting notch 61. The third restricting block 84 is embedded in the third restricting notch 61 to realize the coaxial connection of the second dial 8 and the second movable plate 6.

The immovable plate 2 further has two first perforations 22, a second perforation 23 and a third perforation 24. The two first perforations 22 are in communication with the first inlet 112 and the second inlet 113, respectively. The second perforation 23 is in communication with the first outlet 114. The third perforation 24 is in communication with the second outlet 115. The first movable plate 5 further has two fourth perforations 52, a first groove 53, and a fifth perforation 54. The two fourth perforations 52 are aligned with the two first perforations 22, respectively. When the first movable plate 5 is moved relative to the immovable plate 2, the first groove 53 is in communication with the first perforations 22 and the second perforation 23, or the fifth perforation 54 is in communication with the third perforation 24. The second movable plate 6 further has a second groove 62 and two stop blocks 63 in the second groove 62. The fourth perforations 52 and the fifth perforation 54 are in communication with the second groove 62. The stop blocks 63 are configured to block the corresponding fourth perforations 52 for changing water flow when the second movable plate 6 is rotated relative to the first movable plate 5, so as to realize the adjustment of water temperature.

The waterways formed by the immovable plate 2, the first movable plate 5 and the second movable plate 6 are described below. One waterway is that the water flows through the first inlet 112, the first perforations 22, the first groove 53 and the second perforation 23 to the first outlet 114. Another waterway is that water flows through the first inlet 112, the first perforations 22, the fourth perforations 52, the second groove 62, the fifth perforation 54 and the third perforation 24 to the second outlet 115. The movement of the movable plate unit (i.e., the first movable plate 5) relative to the immovable plate 2 determines that the first groove 53 is in communication with the first perforations 22 and the second perforation 23, or that the fifth perforation 54 is in communication with the first perforations 22, the fourth perforations 52, the second groove 62 and the third perforation 24. That is to say, it determines that the manual spray mode or the automatic spray mode is actuated. The water mixing ratio of the manual spray mode (that is, the water flows out from the first outlet 114) is determined by the relative position of the first movable plate 5 and the immovable plate 2. The water mixing ratio of the automatic spray mode (that is, the water flows out from the second outlet 115) is determined by the relative angle between the second movable plate 6 and the first movable plate 5.

Further, the present invention further comprises a sealing member 9 disposed between the end wall of the accommodating chamber 111 and the immovable plate 2. The sealing member 9 has a first through hole 91, a second through hole 92 and a third through hole 93 corresponding to the first perforations 22, the second perforation 23 and the third perforation 24 respectively, so as to ensure the sealing of the junction of the first perforations 22 and the first inlet 112/the second inlet 113; the second perforation 23 and the first outlet 114; the third perforation 24 and the second outlet 115, respectively.

The first outlet 114 is disposed at the middle position of the end of the casing 1. The first inlet 112, the second inlet 113 and the second outlet 115 are disposed beside the first outlet 114. The second outlet 115 may be single or plural. When the second outlet 115 is plural, the limited space at the end of the casing 1 can be more reasonably utilized in design, so as to ensure the water flow.

Furthermore, an annular step 117 is formed on the peripheral surface of one end of the casing 1 (namely, the main body 11). A sealing ring 10 is sleeved on the annular step 117. The sealing ring 10 is configured to seal the junction of the valve core and the faucet to ensure the sealing effect. Compared with the sealing design on the end face of the casing 1 where the first inlet 112, the second inlet 113, etc. are arranged, the sealing ring 10 on the annular step 117 on the peripheral surface of the casing 1 can avoid occupying the design space of the end face of the casing 1, thereby ensuring sufficient space for designing the cross-sectional area of the second outlet 115 to spray water.

The bracket 3 has a receiving hole 33 for the lever 4 to be movably fitted in the receiving hole 33. A rotating shaft 20 passes through the middle of the lever 4 and is rotatably connected to the side wall of the receiving hole 33 to realize the coaxial connection of the lever 4 and the bracket 3. The lever 4 swings relative to the bracket 3 with the rotating shaft 20 as the axis for driving the movable plate unit. The receiving hole 33 provides a swing space for the lever 4.

The other end of the lever 4 is configured for installation of the handle of the faucet.

Figure 10:
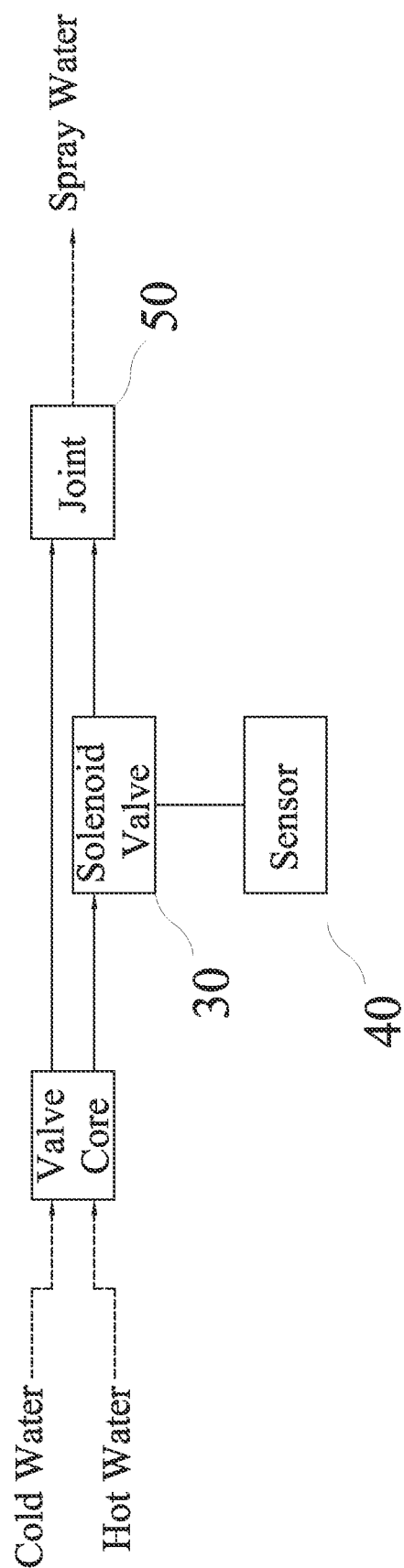
FIG. 10 is a schematic view showing the waterway of the faucet according to an embodiment of the present invention.

Referring to FIG. 10, the present invention further discloses a faucet, comprising the above-mentioned valve core, a solenoid valve 30, a sensor 40 and a three-way joint 50. The first outlet 114 is in communication with the three-way joint 50. The second outlet 115 is in communication with the three-way joint 50 through the solenoid valve 30. The sensor 40 is electrically connected to the solenoid valve 30. The faucet only needs to replace the valve core of the present invention on the basis of the ordinary faucet to realize the modification, so that the faucet has a manual spray mode and an automatic spray mode. The water temperature adjustments of the manual spray mode and the automatic spray mode do not interfere with each other.

The sensor 40 is an infrared sensor or a light sensor.

After the present invention is applied to a faucet, the first inlet 112 is in communication with a cold water pipe, the second inlet 113 is in communication with a hot water pipe, the first outlet 114 and the second outlet 115 are respectively in communication with the water outlet (such as the three-way joint 50) of the faucet, and the water from the second outlet 115 passes through the solenoid valve 30.

Figure 4:
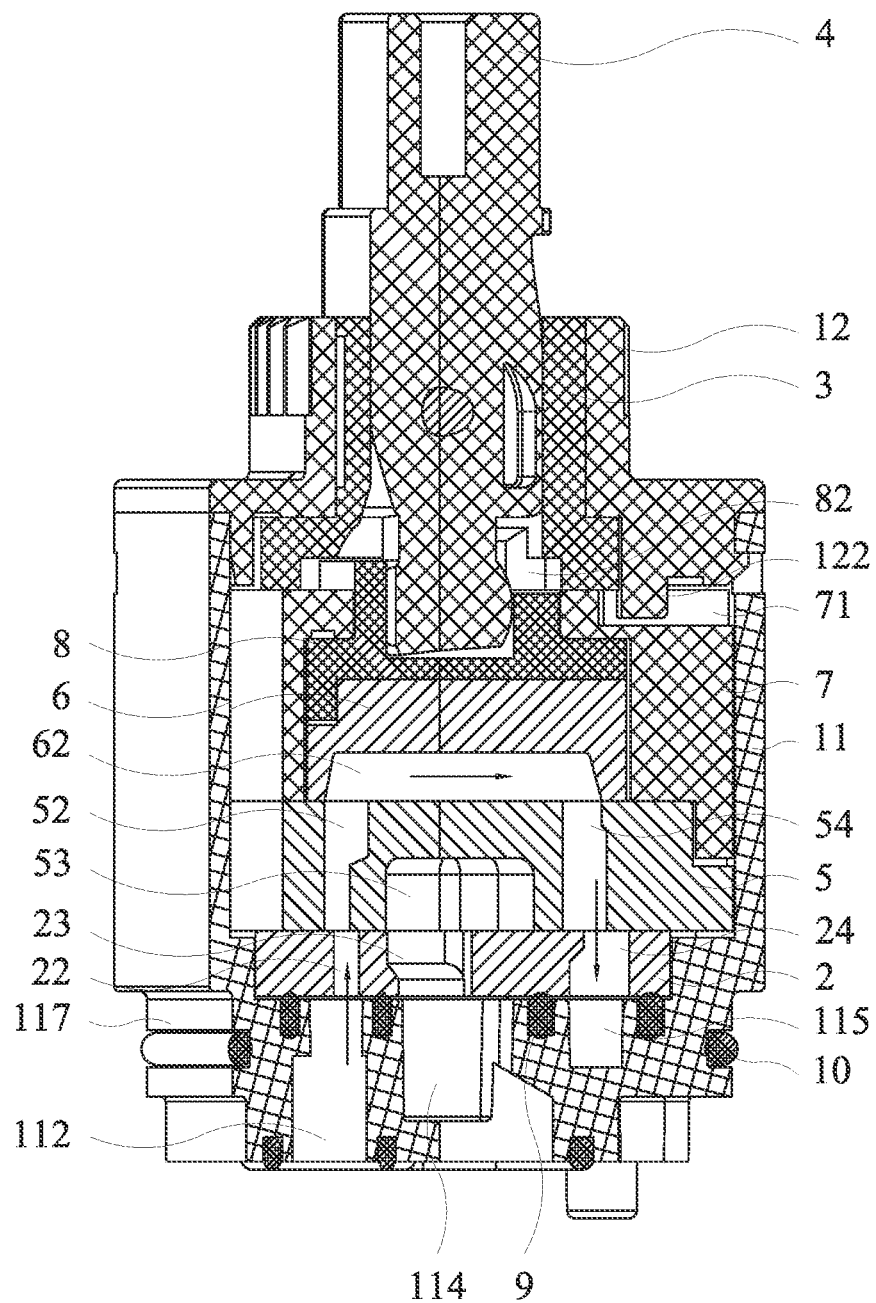
FIG. 4 is a first schematic view according to the embodiment of the present invention, wherein the lever swings to the closed state.
Figure 5:
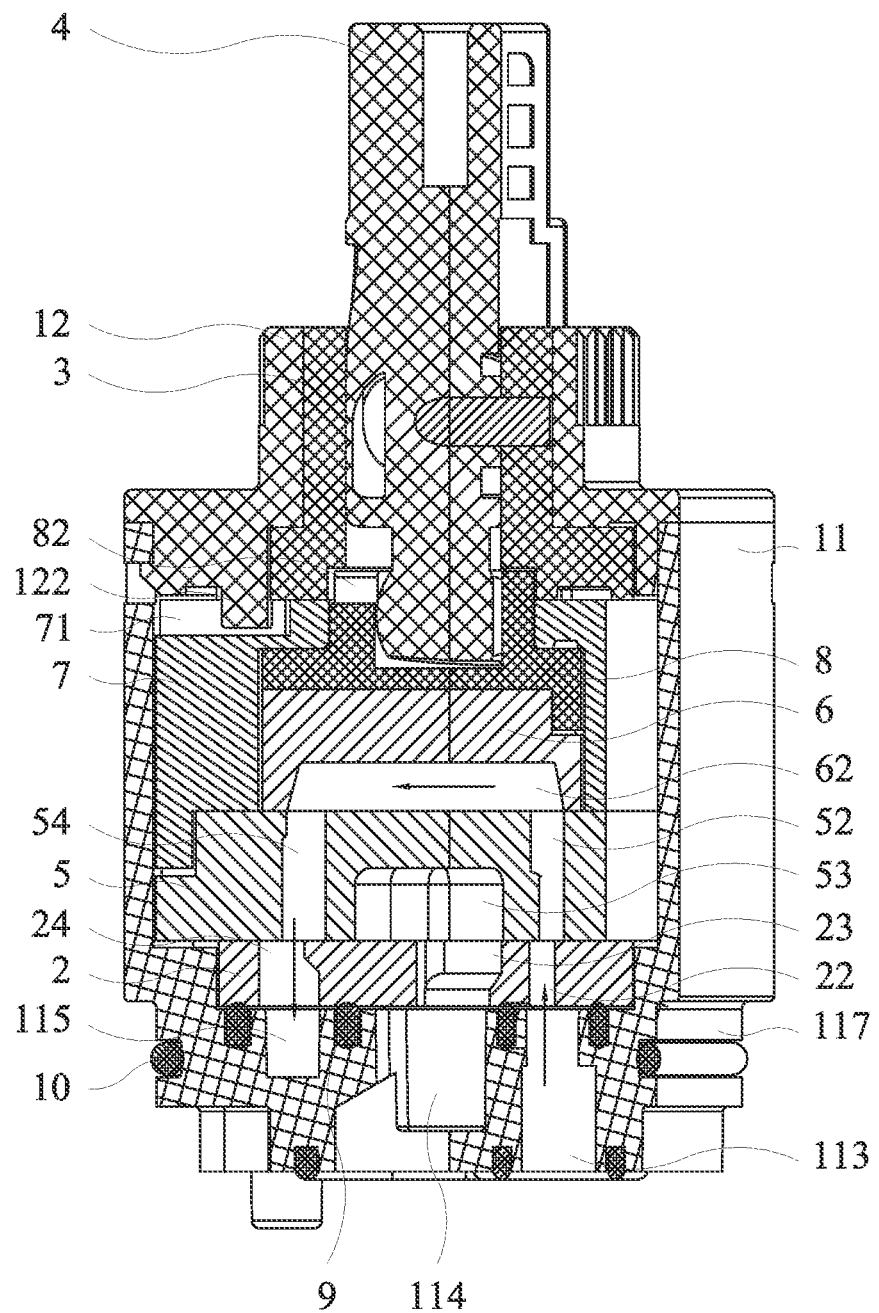
FIG. 5 is a second schematic view according to the embodiment of the present invention, wherein the lever swings to the closed state.

As shown in FIG. 4 and FIG. 5, when the lever 4 swings to be in the closed state, the lever 4 drives the whole movable plate unit to move, so that the relative position of the first movable plate 5 and the immovable plate 2 is changed. The fourth perforations 52, the second groove 62 and the fifth perforation 54 are in communication with the third perforation 24, so that water flows out from the second outlet 115, not from the first outlet 114. That is, the product is in the automatic spray mode, which is controlled by the solenoid valve 30 and the sensor 40. At this time, when the lever 4 is rotated to the center position, the area of the two fourth perforations 52 blocked by the stop blocks 63 is the same. Hot water and cold water is mixed in a ratio of 1:1. After the lever 4 is rotated again, the second movable plate 6 is driven to rotate by the bracket 3 to adjust the relative position of the second movable plate 6 and the first movable plate 5, thereby changing the cross-sectional areas of the two fourth perforations 52 to be opened for delivering water, that is, to adjust the mixing ratio of cold water and hot water of the automatic spray mode.

Figure 6:
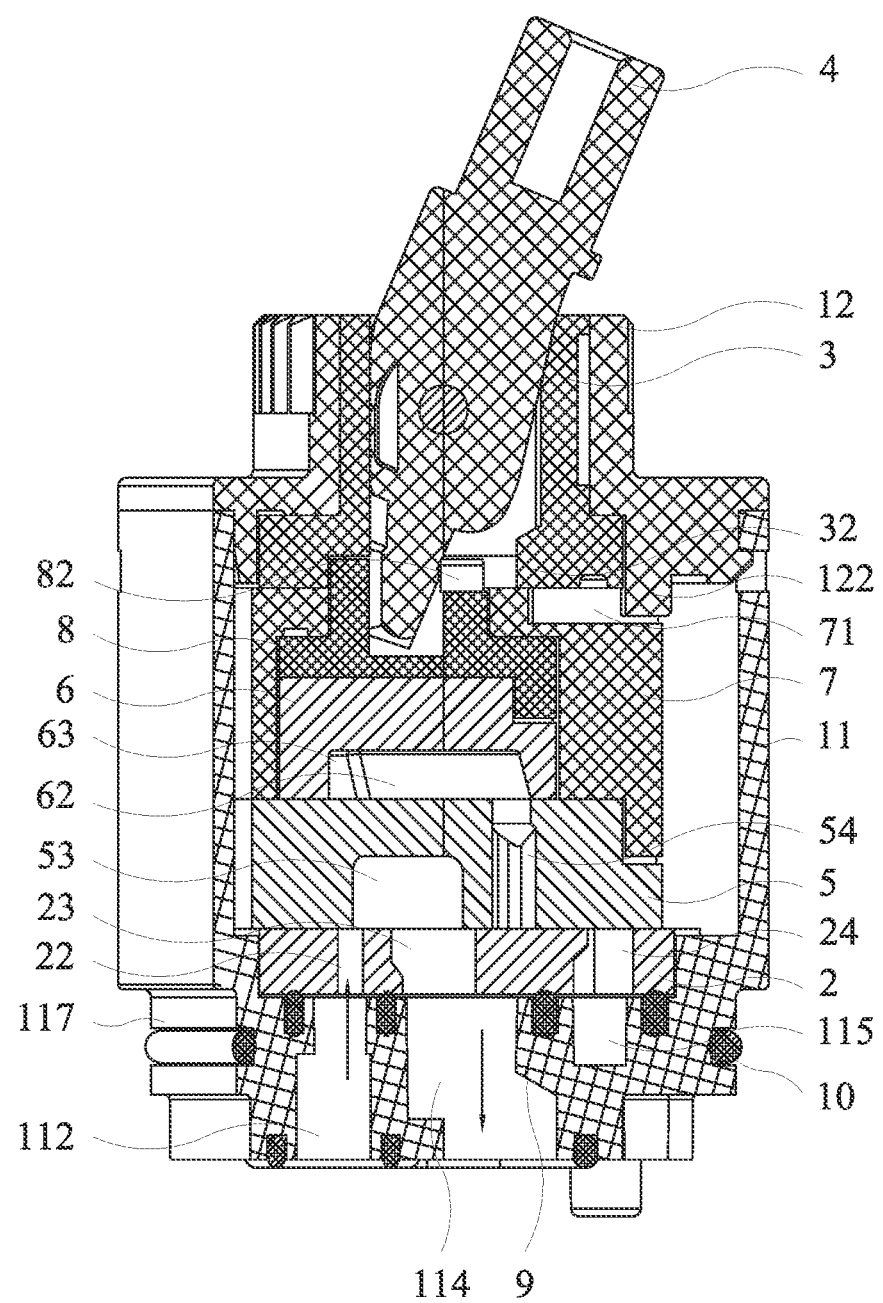
FIG. 6 is a first schematic view according to the embodiment of the present invention, wherein the lever swings to the open state to spray mixed water of cold water and hot water.
Figure 7:
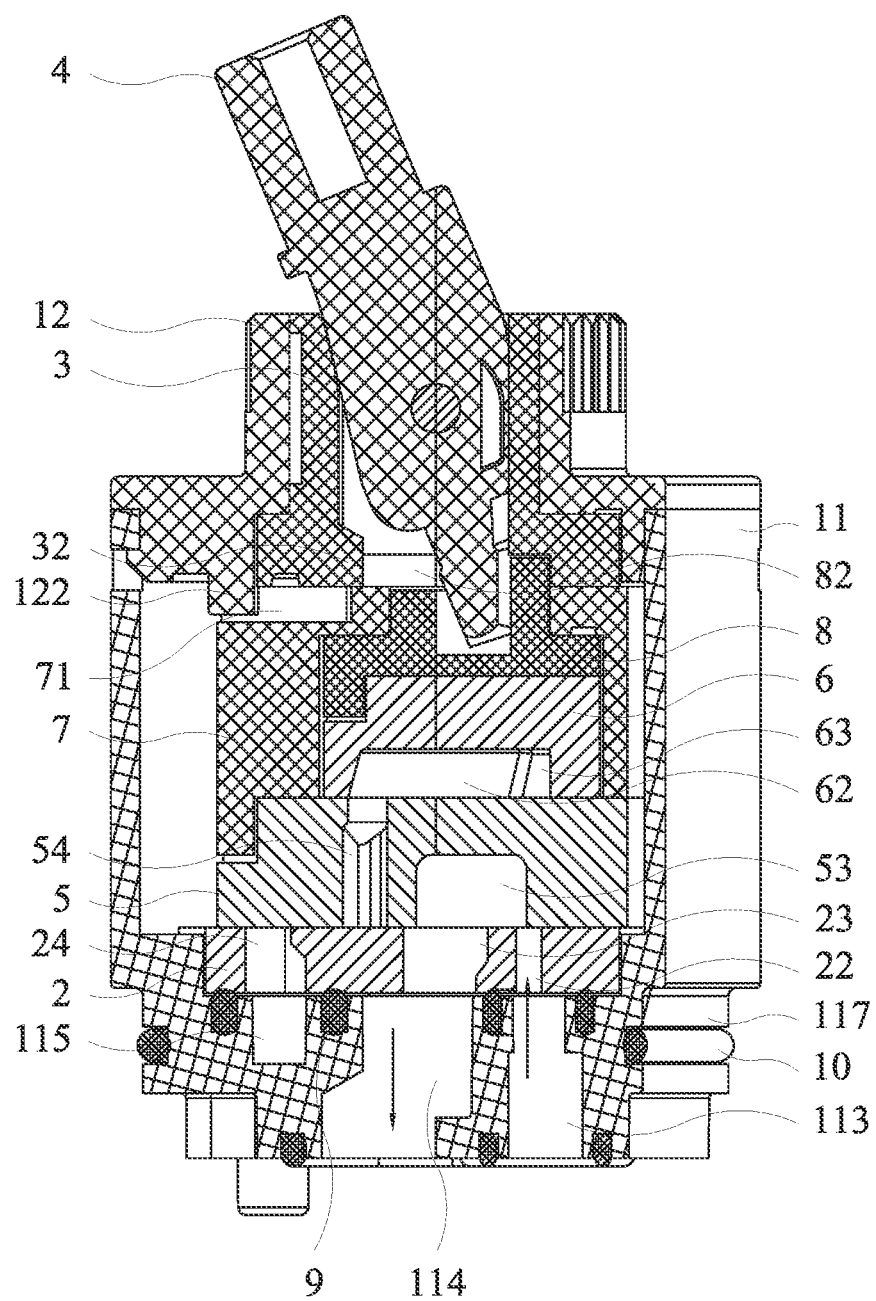
FIG. 7 is a second schematic view according to the embodiment of the present invention, wherein the lever swings to the open state to spray mixed water of cold water and hot water.
Figure 8:
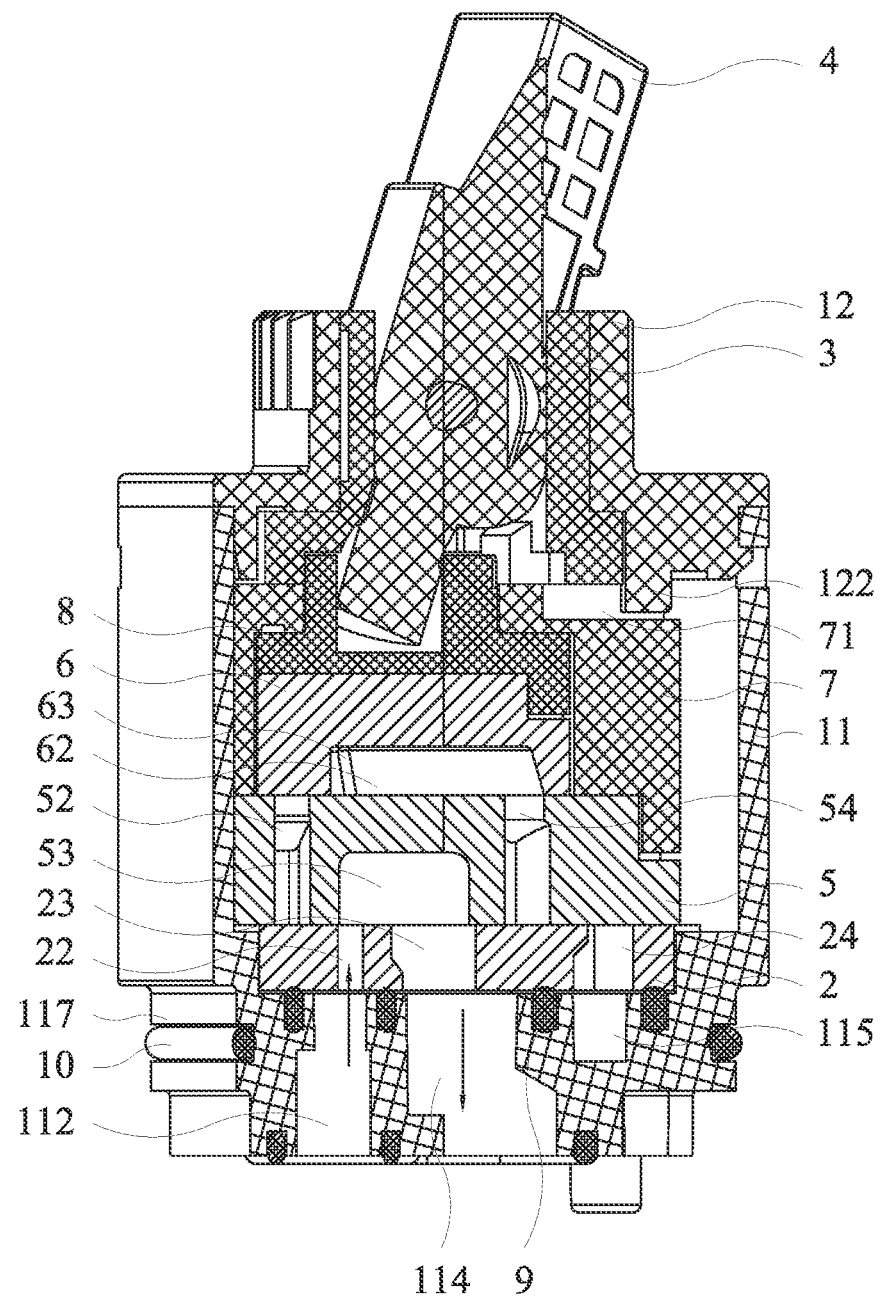
FIG. 8 is a schematic view according to the embodiment of the present invention, wherein the lever swings to the open state to spray cold water.
Figure 9:
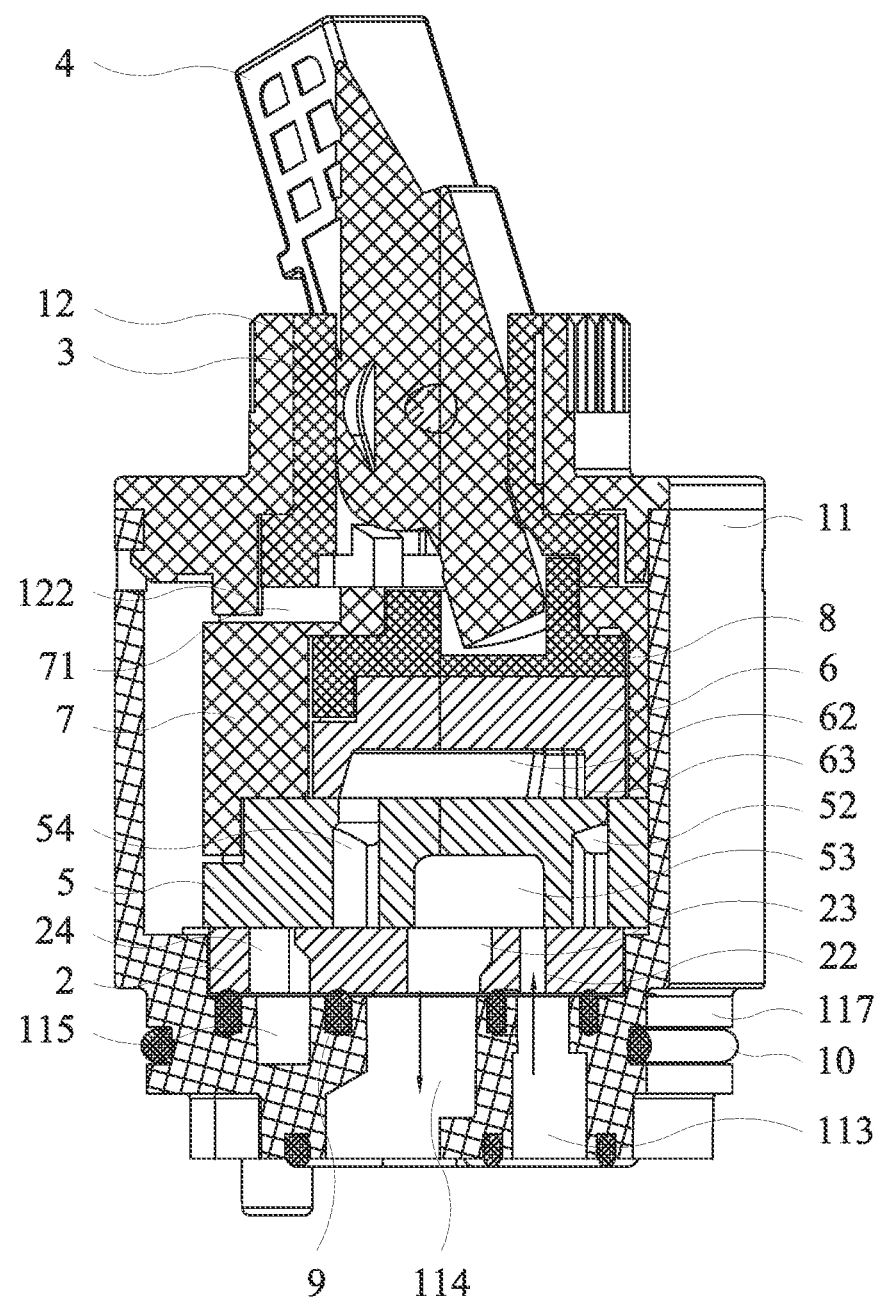
FIG. 9 is a schematic view according to the embodiment of the present invention, wherein the lever swings to the open state to spray hot water.

As shown in FIG. 6 and FIG. 7, when the lever 4 swings to be in the open state and is in the middle position, the lever 4 drives the whole movable plate unit to move, so that the relative position of the first movable plate 5 and the immovable plate 2 is changed. The first groove 53 is in communication with the first perforations 22 and the second perforation 23, so that water flows out from the first outlet 114, not from the second outlet 115. That is, the product is in the manual spray mode, which is controlled by the lever 4 (namely, the handle of the faucet). At this time, since the lever 4 is in the middle position, cold water and hot water are mixed in a ratio of 1:1. As shown in FIG. 8, when the lever 4 swings to be the open state and rotates to the extremity of one side, the first perforation 22 corresponding to the first inlet 112 is completely opened, and the other first perforation 22 corresponding to the second inlet 113 is fully closed, so that all the water to be discharged is cold water. As shown in FIG. 9, when the lever 4 swings to be in the open state and rotates to the extremity of the other side, the first perforation 22 corresponding to the first inlet 112 is completely closed, and the other first perforation 22 corresponding to the second inlet 113 is fully opened, so that the water to be discharged is hot water.

Through the above solution, in the present invention, the immovable plate 2, the first movable plate 5 and the second movable plate 6 are disposed in the casing 1 as a waterway switching mechanism. The first restricting mechanism is disposed between the first dial 7 and the casing 1, and the second restricting mechanism is disposed between the second dial 8 and the bracket 3. Through different actions of the lever 4, the restricting mechanisms can be locked or unlocked. Thereby, different adjustments of the movable plate unit relative to the immovable plate 2 can be realized under the different actions of the lever 4. The opening and closing and a water mixing ratio of the first inlet 112, the second inlet 113 and the first outlet 114/the second outlet 115 are independent of each other, so that temperature adjustment operations of the manual spray mode and the automatic spray mode of the faucet do not interfere with each other.

What is claimed is:

1. A valve core for a faucet, comprising a casing, an immovable plate, a movable plate unit, a bracket, and a lever;
    the casing having an accommodating chamber, one end of the accommodating chamber having a first inlet, a second inlet, a first outlet, and a second outlet;
    the immovable plate, the movable plate unit and the bracket being sequentially fitted in the accommodating chamber in a direction from one end to another end of the accommodating chamber;
    the movable plate unit including a first movable plate, a second movable plate, a first dial and a second dial; the first movable plate and the first dial being coaxially connected, the second movable plate and the second dial being coaxially connected and movably partly fitted between the first movable plate and the first dial;
    wherein a first restricting mechanism includes a protruding post disposed in the accommodating chamber and a guide groove disposed on a surface of the first dial, the guide groove is arranged along a radial direction of the first dial; the protruding post is movable between an inner end and an outer end of the guide groove when the lever swings; when the lever swings to be in the open state, the protruding post is located at the outer end of the guide groove, the lever is rotated for the movable plate unit to swing along a radial direction of the casing with the protruding post as a fulcrum, so as to adjust the relative position of the first movable plate and the immovable plate;
    wherein a second restricting mechanism includes a second protruding block disposed on the bracket and a second notch formed on a boss, and an arc length of the second notch is greater than a width of the second protruding block;
    a middle portion of the lever being coaxially pivoted to the bracket so that the lever can swing relative to the bracket, one end of the lever being connected to the movable plate unit;
    wherein when the lever swings to be in the open state, the first restricting mechanism and the second restricting mechanism are in an unlocked state, the first inlet and the second inlet are in communication with the first outlet and are not in communication with the second outlet, and the lever is rotated to adjust a relative position of the first movable plate and the immovable plate, so as to adjust a water mixing ratio of the first inlet, the second inlet and the first outlet;
    wherein when the lever swings to be in a closed state, the first restricting mechanism and the second restricting mechanism are in a locked state, the first inlet and the second inlet are in communication with the second outlet and are not in communication with the first outlet, and the lever is rotated to adjust a relative angle between the second movable plate and the first movable plate, so as to adjust a water mixing ratio of the first inlet, the second inlet and the second outlet.

2. The valve core as claimed in claim 1, wherein the casing includes a main body and a cover;
    the main body has the accommodating chamber;
    the cover is connected to another end of the main body, and the cover has a mounting hole for insertion of the bracket.

3. The valve core as claimed in claim 1, wherein a first protruding block is disposed in the accommodating chamber, the protruding post is disposed on the first protruding block;
    the bracket has a first notch;
    the first protruding block is movably fitted in the first notch along with rotation of the bracket, and the protruding post passes through the first notch and is fitted in the guide groove.

4. The valve core as claimed in claim 1, wherein the first dial has a receiving chamber therein, the second movable plate and the second dial are movably fitted in the receiving chamber, the first dial further has an opening communicating with the receiving chamber;
    the second dial has the boss matching with the opening, the boss passes through the opening;
    when the lever swings to be in the open state, the second protruding block is separated from a circumferential path of the second notch;
    when the lever swings to be in the closed state, the second protruding block is located in the second notch, the lever drives the bracket to rotate synchronously, so that the second protruding block abuts against one end of the second notch to drive the second dial and the second movable plate to rotate relative to the first movable plate.

5. The valve core as claimed in claim 4, wherein the one end of the lever is a ball joint, the second dial has a receiving groove, the ball joint is movably fitted in the receiving groove, and the second notch is disposed on a side wall of one end of the receiving groove.

6. The valve core as claimed in claim 1, wherein an edge of the immovable plate has a first restricting notch, a first restricting block is disposed on a side wall of the accommodating chamber, the first restricting block is engaged in the first restricting notch;
    edges of mating surfaces of the first dial and the first movable plate have a second restricting block and a second restricting notch, the second restricting block is embedded in the second restricting notch;
    edges of the mating surfaces of the second dial and the second movable plate have a third restricting block and a third restricting notch, and the third restricting block is embedded in the third restricting notch.

7. The valve core as claimed in claim 1, wherein the immovable plate further has two first perforations, a second perforation and a third perforation, the two first perforations are in communication with the first inlet and the second inlet respectively, the second perforation is in communication with the first outlet, the third perforation is in communication with the second outlet;
    the first movable plate further has two fourth perforations, a first groove and a fifth perforation, the two fourth perforations are aligned with the two first perforations respectively, when the first movable plate is moved relative to the immovable plate, the first groove is in communication with the first perforations and the second perforation, or the fifth perforation is in communication with the third perforation;

the second movable plate further has a second groove and two stop blocks in the second groove, the fourth perforations and the fifth perforation are in communication with the second groove; and the stop blocks are configured to block the corresponding fourth perforations for changing water flow when the second movable plate is rotated relative to the first movable plate.

8. The valve core as claimed in claim 7, further comprising a sealing member disposed between an end wall of the accommodating chamber and the immovable plate; the sealing member having a first through hole, a second through hole and a third through hole corresponding to the first perforations, the second perforation and the third perforation, respectively.

9. The valve core as claimed in claim 1, wherein the first outlet is disposed at a middle position of an end of the casing, the first inlet, the second inlet and the second outlet are disposed beside the first outlet, the second outlet includes at least one second outlet.

10. The valve core as claimed in claim 9, wherein an annular step is formed on a peripheral surface of the end of the casing, and a sealing ring is sleeved on the annular step.

* * * * *